United States Patent Office 3,041,187
Patented June 26, 1962

3,041,187
COMPOSITION OF MATTER FOR DECORATING PURPOSES
Wesley A. Jordan, Minneapolis, and Cedric C. Sovia, Forest Lake, Minn., assignors to General Mills, Inc., a corporation of Delaware
No Drawing. Filed May 12, 1960, Ser. No. 28,542
9 Claims. (Cl. 106—15)

This invention relates to a composition of matter for decorating purposes and in particular to a decorative composition which will simulate snow.

The basic constituents of the decorative composition are a flock agent and a dry adhesive. Secondary constituents may be included if desired, such as fireproofing or fire-retardant materials, coloring materials, insecticides and the like. The composition may be applied to a variety of surfaces by any of the conventional methods but is particularly suitable for application by spraying.

It is therefore an object of this invention to provide a decorative composition.

It is also an object of this invention to provide a decorative composition which simulates fresh-fallen snow or heavy frost.

It is also an object of this invention to provide a decorative composition which can be evenly and uniformly applied to a surface.

It is also an object of this invention to provide a decorative composition suitable for spraying.

Other objects and advantages will be apparent from the following description.

One of the primary uses of the present composition is for providing a snow-like appearance on a surface such as a Christmas tree. The decorative composition can also be used on floats and with the use of stencils may be used to provide a decorative design on surfaces such as glass windows and the like. As the composition is used to provide a snow-like appearance of the surface of a Christmas tree, spraying has been found to be a method particularly suitable for application of the decorative composition. It is not necessary, however, that the composition be applied by spraying and any other conventional method of application of decorative compositions may be used.

Where spraying is to be the method of application, certain factors were found to be important. For example, it was found that the adhesive had to wet instantly and develop tack instantly in order that the composition adhere to a surface, since less than one second of time elapses between the time the composition and water is mixed and travels to a surface.

The adhesives which may be employed in this invention are any pregelatinized flour or starch which will meet the tack requirements. The tack can be tested by applying a 10% adhesive solution to size paper, drying the paper and cutting the paper into one inch squares. The adhesive must adhere to a moistened finger when applied, lifting the one inch square. This governs the sticking power of the wetted flock. Any pregelatinized flour or starch which will meet this requirement may be used in this invention. While pregelatinized wheat flour or starch has been used in this invention for the purposes of illustration, any pregelatinized flour or starch from any source whatever which meets the tack requirement may be employed in this invention. Illustrative of such other sources but not limited thereto are corn, tapioca, potato, rice and the like.

Where a heavy snow-like coating is to be applied, it is preferred that the adhesive also have gel strength or otherwise the initial coating may be blown off by the force exerted by the impact of a subsequent coating on the surface or the solids will sag or fall off because of their weight. It is therefore preferred that the adhesive have certain gel strength characteristics which can be determined by the following test.

A solution of 15% adhesive and 85% water must develop sufficient gel strength in 3 minutes to resist penetration more than 40 millimeters into the gel as measured by a Precision Universal penetrometer equipped with a special cone having a one inch base and 1¾" altitude under a force of 67.8 grams for five seconds. An adhesive which allows more than 40 millimeters' cone penetration into the three minute old gel is not sufficiently firm to prevent sagging of the applied composition. If a firmer gel is desired, gels having a penetration to about 30 millimeters under the same test conditions may be used.

It is to be understood that this gel strength requirement becomes important where a heavy snow-like coating is to be applied. Where very light coatings resembling frost or a light freshly-fallen snow are desired, it is only necessary that the adhesive meet the tack requirement. In general, if the adhesive meets the tack requirements the coating will not fall off because of its weight. If the gel strength is insufficient the gel strength may be "built-up" or increased by the addition of certain agents such as borax.

Satisfactory coatings may be achieved over a wide range of bulk densities. It is possible, however, that in some instances bulk density may be a factor which must be considered, since, when spraying is the method employed in applying the flock, a stream of air is used to carry the flock from a container onto the tree. For instance, if the bulk density is improper, the flow of decorative material may be non-uniform and incomplete, thereby providing an unsatisfactory coating. The bulk density requirements will vary dependent on the particular spray apparatus used, the nature of the particular materials used and the particular type of coating desired. In general, variations of the type of material used and/or the proportions thereof will provide the necessary adjustment of the bulk density to give the particular type of coating desired. Where methods of application other than spraying are used, the bulk density generally need not be considered.

A wide variety of flock agents may be used in the decorative composition. The only requirement for the flock agent appears to be that it will adhere to a water base adhesive. When used herein throughout the specification the term "flock agent" is understood as including only those agents which will adhere to a water base adhesive. A large variety of agents will fall within this category. Cellulose or cellulose-derived agents such as wood pulp (sulfite pulp), cotton, and cellulose derived fibers such as rayon and cellulose acetate may be used. In addition to cotton, vegetable fibers of all types such as jute, and the like may also be used. Also other synthetic fibers such as polyvinylidene fibers and polyester fibers (Dacron) may be used. Animal hairs such as rabbit, horse, goat and hog hair may be used. Other agents which illustrate the general field and may be used are glass wool, asbestos, excelsior, chopped feathers and the like. In addition, mixtures of the various fibers may be used. For example, some long rayon fibers may be mixed with short fibers of other types to act as mechanical reinforcing "rods" to add some mechanical strength to the finished product. High percentages of rayon with wood pulp or cotton would have a texture intermediate between the smooth silky texture of rayon and the fluffy texture of wood pulp.

The invention can best be illustrated by means of the following examples in which all amounts are expressed in parts by weight unless noted otherwise.

EXAMPLE I

A pregelatinized wheat flour and a sulfite pulp were dry blended in various proportions and sprayed onto a tree with spraying apparatus which expelled the dry ingredients and water simultaneously. The following Table I will illustrate the results.

*Table I*

| Blend | Percent Flour | Percent Pulp | Bulk Density, cc./100 Grams | Results |
|---|---|---|---|---|
| 1 | 20 | 80 | 1,450 | Light-fluffy, freshly-fallen snow appearance. Adhesion fair. |
| 2 | 30 | 70 | 1,250 | Appearance similar to Blend 1. Adhesion better. |
| 3 | 40 | 60 | 1,100 | A wet snow appearance. Adhesion good. |
| 4 | 50 | 50 | 1,050 | A wet snow slightly heavier than Blend 3. If lightly applied coating resembles frost. Adhesion very good. |
| 5 | 60 | 40 | 900 | Heavy wet snow, flat and matted, resembling partially melted snow which was refrozen. If lightly applied coating resembled hoarfrost. Adhesion very good. |

From the foregoing data it is apparent that the amount of adhesive can be varied from 20 to 60% while the amount of pulp can be varied from 80 to 40%. The preferred range would be from 35 to 40% adhesive and from 65 to 60% sulfite pulp.

This range of proportions of the ingredients also holds for the other flocks such as cotton, rayon and the others mentioned above. As previously noted, in coatings which are to be sprayed, bulk density is a factor which should be considered. In other methods of applying the coatings, bulk density may not be a factor. It is apparent, however, from the foregoing data, that satisfactory spray coatings can be obtained with sulfite pulp when the composition has a wide bulk density range of about 900 to 1,450 cc. per 100 grams. This range will vary somewhat dependent on the particular spray apparatus used. In general a bulk density of about 1,000 to 1,200 cc. per 100 grams would be used in this instance with sulfite pulp.

In addition to the pregelatinized flour or starch, the addition of small amounts of other materials have been found to improve the adhesive properties. It was found that the addition of borax improves the adhesion properties by increasing gel strength. The borax may be added in amounts up to about 15% by weight based on the total composition to improve the gel strength and thereby the adhesion. While the borax does lend some fire-retardant properties to the mixture as well, the use of up to 15% borax is used for improvement of adhesion properties, the fire-retardant properties being incidental thereto.

EXAMPLE II

| | Parts |
|---|---|
| Pregelatinized flour | 20 |
| Sulfite pulp | 75 |
| Borax | 5 |

The ingredients were dry blended and sprayed in the same manner as Example I. The coating had an appearance of a fallen snow and the adhesion was very good.

Comparing the coating of Example II with the blends of Example I, it is apparent that the addition of borax greatly improves the adhesion properties as well as providing some fire-retarding properties. The amounts of flour and pulp used in Example II correspond closely to the amounts used in blend 1 or 2 of Example I, but unexpectedly the adhesion was greatly improved corresponding more closely to blends 4 and 5 of Example I.

In many instances local codes and safety practices will dictate that a fire-retardant agent be incorporated in the decorative composition or in the water used for spraying. One of such instances arises when the decorative composition is to be applied to Christmas trees which are to be used inside the home. Where fire-retardant or fire-proofing materials are to be used, they may either be incorporated in the decorative composition or in the water used for spraying.

Some fire-retardant chemicals such as ammonium chloride, not only impart fire resistance but also lower the water freezing point. It is known that water sprayed at subfreezing temperatures turns to snow. If flock application is done at below freezing conditions, a lowering of the water's freezing point is essential. Furthermore, some of the better fire-retarding agents are quite dense solids and their use in a single system is difficult because of the overall bulk density requirement. Thus, if such dense agents are first dissolved in the water, the bulk density and subsequent discharge problems are minimized.

The best fire-retardant agent discovered for the composition is an equal weight mixture of borax and monobasic calcium phosphate dissolved in water. This mixture in water forms a milk-like colloid which imparts both opacity and fireproofness to the flock. However, the dry ingredients, borax and monobasic calcium phosphate may not be suitable for the dry blending with adhesive and cellulose fiber for some applications because the bulk density of the blend may be outside the workable level. Thus, if a fire-retarding agent is to be incorporated in the dry mix, fire-retarding effectiveness must be balanced against the density of the blend. Fire-retarding materials which are satisfactory generally for dry blending are ammonium chloride, borax and boric acid. Those which are sometimes not suitable for dry blending are most of the phosphates because of their density. However, because of the formation of the milk-like colloid with water, an equal weight mixture of borax and monobasic calcium phosphate is preferred for the fire-retardant agent. If incorporation of this mixture in a dry blend will exceed the bulk density requirements for the particular application, the agent may then be dissolved in the water rather than used in the dry blend.

In the examples which follow, a variety of fire-retarding agents are used in various proportions.

EXAMPLE III

| | Parts |
|---|---|
| Pregelatinized flour | 20 |
| Sulfite pulp | 60 |
| Ammonium chloride | 15 |
| Borax | 5 |

The ingredients were blended and sprayed simultaneously with water onto a pine tree. The coating appeared snow-covered and the coating was fire-resistant.

EXAMPLE IV

| | Parts |
|---|---|
| Pregelatinized flour | 40 |
| Sulfite pulp | 40 |
| Borax | 10 |
| Monobasic calcium phosphate | 10 |

The ingredients were blended and sprayed onto a pine tree simultaneously with water. The dried coating imparted a heavy frost-like appearance to the tree which was fire-resistant.

EXAMPLE V

| | Parts |
|---|---|
| Pregelatinized flour | 35 |
| Sulfite pulp | 65 |
| Borax | 5 |
| Ammonium chloride | 15 |

The borax and ammonium chloride were dispersed in 750 parts of water and the flour and the pulp were dry blended. The water solution and the dry blend were sprayed simultaneously on a spruce tree. The dried product appeared like snow and was fire-resistant.

EXAMPLE VI

| | Parts |
|---|---|
| Pregelatinized flour | 40 |
| Sulfite pulp | 60 |
| Borax | 20 |
| Monobasic calcium phosphate | 20 |

The borax and phosphate were mixed in 750 parts of water forming a milk-like colloid. The flour and pulp were dry blended. The dry blend and the above colloid were then sprayed simultaneously onto a pine tree and gave a frost-snow effect which was fire-resistant. Applying this to cheese cloth gave a rough decorative effect which has possibilities for window dressing, floats, etc.

EXAMPLE VII

| | Parts |
|---|---|
| Pregelatinized flour | 40 |
| Sulfite pulp | 40 |
| Ammonium chloride | 20 |

The ingredients were dry blended and sprayed simultaneously with water onto an evergreen, which gave a heavy frost effect. The dried product was fire-resistant.

From the foregoing examples, it is apparent that the fire-retarding agent may be varied over a range of from 10 to 30% of the total composition excluding the water. The preferred amount would appear to be about 20%. Amounts below 10%, while providing some fire-retarding action, are generally not sufficient to satisfy local codes and ordinances or provide a satisfactory safety protection for use in the home. However, as previously noted, one fire-retardant agent such as borax may be used in amounts up to 15% to improve the adhesion properties of the adhesive providing a small amount of fire-retardant properties. The Composition of Example II would, however, not be considered a fire-retardant composition for use in the home.

Other secondary constituents, in addition to fire-retarding agents may be used in the composition as previously noted. Example VIII below illustrates the use of powdered sodium chloride in the composition to provide a crystalline-snowy effect. In addition to sodium chloride, other agents such as mica and the like may be incorporated in the composition to produce the crystalline effect.

EXAMPLE VIII

| | Parts |
|---|---|
| Pregelatinized flour | 40 |
| Sulfite pulp | 40 |
| Powdered sodium chloride | 20 |

The above ingredients were dry blended and sprayed simultaneously with water onto a spruce tree. During drying the sodium chloride crystallized, producing a crystalline snow effect.

Other secondary constituents which may be used are coloring agents. Example IX below illustrates the invention using the methylene blue dye. In addition to the coloring agent, a fire-retardant agent is also incorporated. It is understood, however, that in applications where fire-retardant properties are not required, the secondary constituent such as a dye may be incorporated without the fire-retardant agent.

EXAMPLE IX

| | Parts |
|---|---|
| Pregelatinized flour | 20 |
| Sulfite pulp | 60 |
| Borax | 5 |
| Ammonium chloride | 15 |
| Methylene blue | 1 |
| Water | 750 |

The water and dye were mixed. The balance of the above ingredients were dry blended. Upon spraying a pine tree a valvet blue coating was produced which was fire-resistant.

In addition to the secondary constituents illustrated above, other constituents such as insecticides may be incorporated into the composition where desirable.

Decorative compositions using other flock agents were used. The proportions employed were as given in Example III. All of the compositions in the following table gave satisfactory coatings providing a snow-like effect. As a fire-retardant was employed as in Example III, the coating was fire-resistant.

Table II

| Blend | Flock | Bulk Density cc./100 Grams |
|---|---|---|
| 1 | Wood cellulose | 1,010 |
| 2 | Rayon | 460 |
| 3 | do | 950 |
| 4 | 55 parts wood cellulose, 5 parts rayon | |
| 5 | Cotton | 1,330 |

The foregoing indicates that a variety of flock agents may be used. As previously noted, bulk density requirements will vary dependent on the nature of the particular flock agent used. Whereas Table I shows that the appearance of coatings formulated with pulp vary from light-fluffy snow to heavy wet, flat and matted snow as the bulk density decreases, this observation did not always apply when other than pulp flock agents were employed. The lower bulk density compositions listed in Table II gave lighter coatings resembling light snow or frost. The higher bulk densities provided wet-like snows of a vary-degree of heaviness. It is apparent that synthetic fibers may be used as the flock agent and mixtures of the flock agents may be used. The use of a small portion of rayon in the wood cellulose flock lent mechanical strength to the finished product, but provided an appearance substantially identical to a composition where no rayon was employed. Where rayon alone is employed a smooth, silky texture is provided while wood pulp and cotton produce a fluffy texture. By varying the proportions of rayon with wood pulp or cotton, intermediate textures are provided. Accordingly, coatings of varying appearance may be provided by varying the nature of the flock agent used.

It is understood that numerous variations of the composition may be made in the present invention which is to be limited only by the scope of the appended claims.

This is a continuation-in-part application of our application Serial No. 774,122, filed November 17, 1958, now abandoned.

It is therefore claimed:

1. A decorative composition consisting essentially of a dry mixture of from 80 to 40 percent of a flock agent and from 20 to 60 percent of an adhesive selected from the group consisting of pregelatinized flour, pregelatinized flour with up to 15 percent borax, pregelatinized starch, pregelatinized starch with up to 15 percent borax, mixtures of pregelatinized flour and pregelatinized starch and mixtures of pregelatinized flour and pregelatinized starch with up to 15 percent borax.

2. A decorative composition as defined in claim 1, containing from 60 to 40 percent of said flock agent and from 20 to 40 percent of said adhesive.

3. A decorative composition consisting essentially of a dry mixture of from 80 to 40 percent of a flock agent, from 20 to 60 percent of an adhesive selected from the group consisting of pregelatinized flour, pregelatinized flour with up to 15 percent borax, pregelatinized starch, pregelatinized starch with up to 15 percent borax, mixtures of pregelatinized flour and pregelatinized starch and mixtures of pregelatinized flour and pregelatinized starch with up to 15 percent borax and from 10 to 30 percent of a fire-retarding compound.

4. A decorative composition as defined in claim 3 in which said fire-retarding compound consists essentially of an equal weight mixture of borax and monobasic calcium phosphate.

5. A decorative composition as defined in claim 3 in which said fire-retarding compound consists essentially of a mixture of borax and ammonium chloride.

6. A decorative composition as defined in claim 3 in which said fire-retarding compound consists essentially of borax.

7. A decorative composition as defined in claim 1 in which said adhesive is pregelatinized wheat flour.

8. A decorative composition adapted for simulating snow and ice upon being applied in a dry state and simultaneously being brought into contact with water immediately on being applied, said composition consisting essentially of a dry mixture of from 80 to 40 percent of a flock agent and from 20 to 60 percent of an adhesive selected from the group consisting of pregelatinized flour, pregelatinized flour with up to 15 percent borax, pregelatinized starch, pregelatinized starch with up to 15 percent borax, mixtures of pregelatinized flour and pregelatinized starch and mixtures of pregelatinized flour and pregelatinized starch with up to 15 percent borax.

9. A decorative composition adapted for simulating snow and ice upon being applied in a dry state and simultaneously being brought into contact with water immediately on being applied, said composition consisting essentially of a dry mixture of from 80 to 40 percent of a flock agent and from 20 to 60 percent of an adhesive selected from the group consisting of pregelatinized flour, pregelatinized flour with up to 15 percent borax, pregelatinized starch, pregelatinized starch with up to 15 percent borax, mixtures of pregelatinized flour and pregelatinized starch and mixtures of pregelatinized flour and pregelatinized starch with up to 15 percent borax and from 10 to 30 percent of a fire-retarding compound.

References Cited in the file of this patent
UNITED STATES PATENTS

| | | |
|---|---|---|
| 2,609,303 | Harris | Sept. 2, 1952 |
| 2,852,368 | Steck et al. | Sept. 16, 1958 |